United States Patent
Fröhler et al.

(10) Patent No.: US 9,912,035 B2
(45) Date of Patent: Mar. 6, 2018

(54) RETAINING AND ANCHORING DEVICE ON A METAL PLATE FOR FASTENING A FUNCTIONAL SUPPORT

(75) Inventors: Christian Fröhler, Halfing (DE); Mario Günther, Kolbermoor (DE); Johann Baptist Obermaier, Weiching (DE)

(73) Assignee: Kathrein-Werke KG, Rosenheim (DE)

( * ) Notice: Subject to any disclaimer, the term of this patent is extended or adjusted under 35 U.S.C. 154(b) by 539 days.

(21) Appl. No.: 14/000,438

(22) PCT Filed: Feb. 23, 2012

(86) PCT No.: PCT/EP2012/000784
§ 371 (c)(1),
(2), (4) Date: Aug. 20, 2013

(87) PCT Pub. No.: WO2012/113560
PCT Pub. Date: Aug. 30, 2012

(65) Prior Publication Data
US 2013/0328744 A1    Dec. 12, 2013

(30) Foreign Application Priority Data
Feb. 24, 2011   (DE) .................. 10 2011 012 283

(51) Int. Cl.
*H01Q 1/12*   (2006.01)
*B21D 39/03*  (2006.01)
(Continued)

(52) U.S. Cl.
CPC ............. *H01Q 1/12* (2013.01); *B21D 39/03* (2013.01); *B21D 39/031* (2013.01);
(Continued)

(58) Field of Classification Search
CPC ........ H01Q 1/12; H01Q 1/1207; H01Q 12/14; H01Q 12/1221; H01Q 12/1228;
(Continued)

(56) References Cited

U.S. PATENT DOCUMENTS 1,294,486 A    2/1919   Kuen
3,024,525 A *  3/1962   Wisberger ............ B21D 26/059
                                                  228/155

(Continued)

FOREIGN PATENT DOCUMENTS

CN    1182653 A    5/1998
DE    28 46 943    2/1980
(Continued)

OTHER PUBLICATIONS

English Translation of the Written Opinion of the International Searching Authority Sep. 10, 2012.*
(Continued)

*Primary Examiner* — Dameon E Levi
*Assistant Examiner* — Jennifer F Hu
(74) *Attorney, Agent, or Firm* — Nixon & Vanderhye P.C.

(57) ABSTRACT

A retaining and anchoring device forming a retaining and anchoring section on a metal plate on a reflector includes a recess provided in the metal plate. The recess has on an upper face of the metal plate a peripheral edge or edge sections spaced apart from one another. An undercut or several undercut sections are formed below the peripheral edge or the edge sections. The recess is free of bores or passages. A locking device prevents unintentional removal of a snap-on mechanism from the recess beyond an edge section or plural edge sections which cover the undercut section(s).

14 Claims, 13 Drawing Sheets

(51) Int. Cl.
*F16B 5/06* (2006.01)
*F16B 9/02* (2006.01)
*F16B 21/08* (2006.01)
*F16B 17/00* (2006.01)
*F16B 5/00* (2006.01)

(52) U.S. Cl.
CPC ............ *F16B 5/0664* (2013.01); *F16B 9/023* (2013.01); *F16B 17/00* (2013.01); *F16B 17/002* (2013.01); *F16B 21/088* (2013.01); *F16B 5/0096* (2013.01); *Y10T 403/49* (2015.01); *Y10T 403/60* (2015.01); *Y10T 403/70* (2015.01)

(58) Field of Classification Search
CPC .... H01Q 12/1242; H01Q 12/125; H01Q 1/20; B21D 31/06; B21D 39/031; F16B 5/00
USPC .................................................. 343/878, 873
See application file for complete search history.

(56) References Cited

U.S. PATENT DOCUMENTS

| | | | | |
|---|---|---|---|---|
| 3,389,931 A * | 6/1968 | St John | ................ | E04B 1/2612 256/59 |
| 3,697,104 A * | 10/1972 | Soulie | ..................... | E21B 23/10 24/607 |
| 4,193,333 A * | 3/1980 | Hallock | ................ | B23P 19/062 29/432.1 |
| 4,294,486 A * | 10/1981 | Espejo | .................... | E04H 15/32 135/88.15 |
| 5,155,897 A * | 10/1992 | Schleicher | ........... | B21D 39/031 29/509 |
| 6,146,072 A * | 11/2000 | Muller | ................... | B23P 19/062 411/176 |
| 6,497,433 B1 * | 12/2002 | Ketcham | ............. | F16L 37/0985 285/319 |
| 7,679,576 B2 * | 3/2010 | Riedel | .................... | H01Q 1/243 343/797 |
| 2006/0066018 A1 * | 3/2006 | Rudduck | .............. | B62D 23/005 269/309 |
| 2007/0228350 A1 * | 10/2007 | Szuba | .................. | B21D 39/032 256/13.1 |

FOREIGN PATENT DOCUMENTS

| | | | | |
|---|---|---|---|---|
| DE | 2846943 | A1 * | 2/1980 | ........... B23P 19/062 |
| DE | 31 30 470 | | 2/1983 | |
| DE | 3130470 | A1 * | 2/1983 | ........... B21D 39/031 |
| DE | 197 23 415 | | 1/1999 | |
| DE | 19723415 | C1 * | 1/1999 | ........... F16B 17/006 |
| DE | 10315724 | A1 | 11/2003 | |
| DE | 10226668 | A1 | 12/2003 | |
| FR | 1 135 901 | | 5/1957 | |
| FR | 1135907 | A * | 5/1957 | ............. D04B 35/10 |
| FR | 1 402 072 | | 6/1965 | |
| FR | 1402072 | A * | 6/1965 | ............. F16B 2/245 |
| JP | 61 164028 | | 7/1986 | |
| JP | 61164028 | A * | 7/1986 | |
| WO | WO 02/074612 | | 9/2002 | |
| WO | WO 02074612 | A1 * | 9/2002 | ........... B62D 23/005 |

OTHER PUBLICATIONS

International Search Report for PCT/EP2012/000784 dated Mar. 22, 2012.
Written Opinion of the International Searching Authority dated Sep. 10, 2012.
People's Republic of China Search Report dated Nov. 2, 2014, issued in Chinese Patent Application No. 201280009580.X.

* cited by examiner

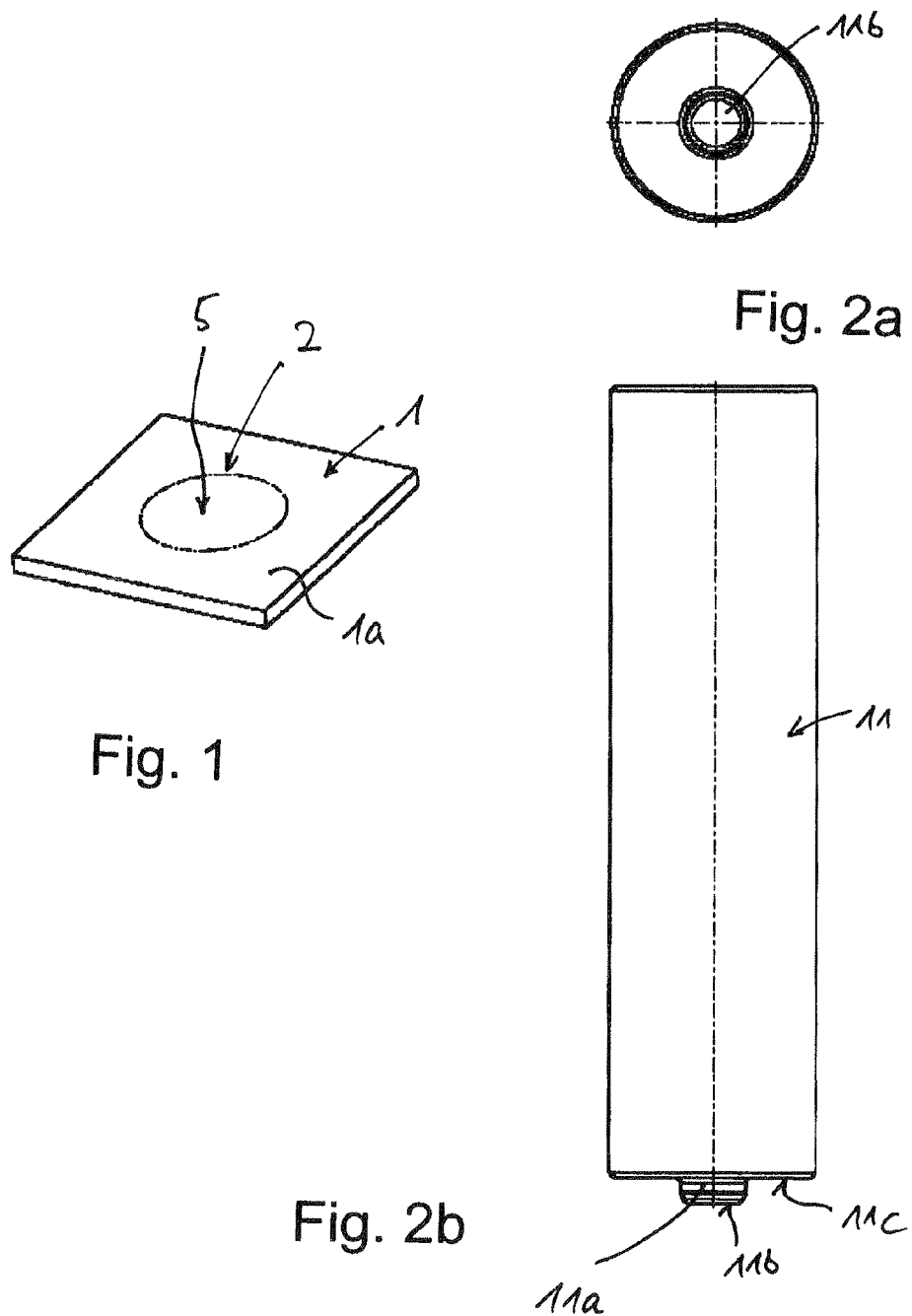

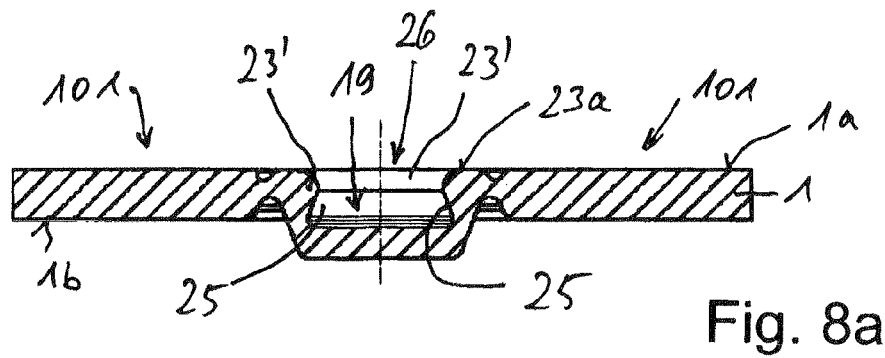
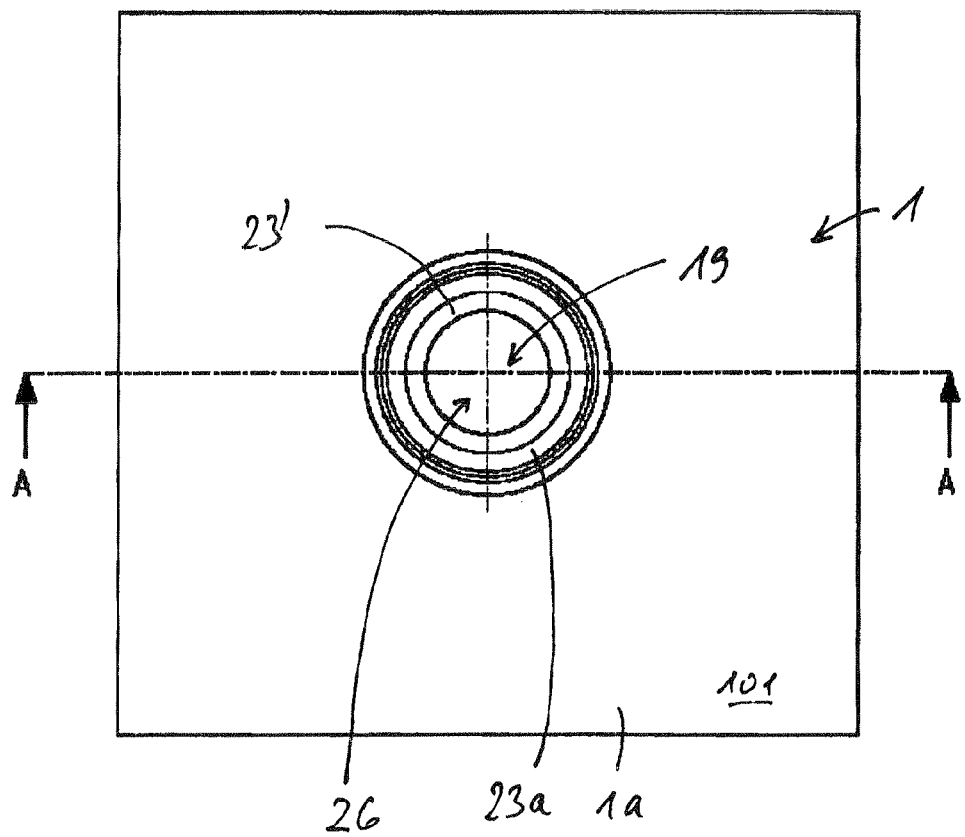
Fig. 8a
Fig. 8b

RETAINING AND ANCHORING DEVICE ON A METAL PLATE FOR FASTENING A FUNCTIONAL SUPPORT

This application is the U.S. national phase of International Application No. PCT/EP2012/000784 filed 23 Feb. 2012 which designated the U.S. and claims priority to DE 10 2011 012 283.4 filed 24 Feb. 2011, the entire contents of each of which are hereby incorporated by reference.

FIELD

The invention relates to a retaining and anchoring device on a metal plate for fastening a functional support according to the pre-characterising clause of claim 1 and to an associated method for its production according to the pre-characterising clause of claim 15.

BACKGROUND AND SUMMARY

In many cases it is necessary to fasten other functional parts to metal plates or metal sheets. This can basically occur by way of welding, possibly by riveting, screwing, etc.

In mobile communications as a rule a plurality of emitter devices, regardless of whether they have by way of example single or dual polarisation, are often assembled in one or more gap(s) in a fitting direction (conventionally in the vertical direction) at a spacing from each other and in front of a reflector. The reflector forms the outer skin of the antenna, wherein a radome protecting the emitters is provided on the reflector on the side which receives the emitters. In addition, a large number of functional parts must be provided on the reflector, and in particular insulating supports on which by way of example adjustment elements are movably mounted and are required to actuate phase shifters accommodated in the antenna device to set a different down-tilt angle. Furthermore, functional supports of this kind are often also used to anchor a large number of cables, and in particular coaxial cables or strip lines, etc. thereto, and these run inside the antenna (therefore as a rule in front of the reflector and underneath the radome covering the entire antenna device).

In addition to cable retainers of this kind, retainers for connecting rods, by way of example for actuation of said phase shifters, retainers for coupling elements, etc., a large number or supports are therefore used, which for the sake of simplicity will hereinafter be called functional supports for short, as are assembled by way of example on a reflector, i.e. a reflector sheet on the emitter side of the reflector.

Standard fastening means or retainers made of plastics material parts are conventionally used for this purpose and are fitted on the reflector side with a receiving space provided with undercuts, in which space by way of example a nut, in particular an aluminium nut, is non-rotatably held. The shaft of the threaded screw is then screwed from the back of the reflector into this aluminium nut, through a hole made in the reflector, until the functional part is fastened to the reflector sheet.

Since, on the other hand, the entire antenna device should be as impermeable as possible, as a rule screws are used which have a circumferential annular groove on the underside of the screw head. An O-shaped rubber-resilient sealing element is inserted in this annular groove. When the screw is tightened, the rubber-resilient element is consequently pressed between the underside of the screw head and the back of the reflector so that if possible no moisture can penetrate into the interior of the antenna housing (radome) by way of the hole in the reflector sheet through which the screw shaft penetrates.

As a rule there is an additional problem, moreover, in that the occurrence of intermodulations cannot be ruled out with fastening methods of this kind. Such intermodulations are disadvantageous in particular in high-frequency technology, however, and primarily in the field of mobile communications technology.

The object of the present invention is therefore to create an improved fastening mechanism which can preferably be applied in the case of metal sheets, as well as an associated method for its production.

With respect to a correspondingly constructed metal plate comprising a retaining and anchoring device provided according to the invention, the object is achieved according to the features disclosed in claim 1 and, with respect to a method according to the invention is achieved according to the features disclosed in claim 15.

Advantageous embodiments of the invention are disclosed in the subclaims.

The present invention takes a completely new path which has distinct advantages over the previous approach.

According to the invention, it is namely proposed that a retaining section is constructed on a metal plate, and in the present case, in particular in the field of mobile communications technology, on a reflector sheet, to which section a functional support can then be fastened.

The core of the invention is founded on the fact that the corresponding retaining section is constructed on the plate in a manner free from holes, i.e. is completely impermeable.

In a deviation from the prior art, a hole does not therefore need to be made in the sheet to introduce a screw shaft for fastening of a functional carrier. The impermeability of the support sheet is retained in full as a result.

A further fundamental advantage has proven to be that within the scope of the invention no additional part, such as a screw, a nut, etc. is necessary, as was previously required in the prior art.

The solution according to the invention is finally distinctive in that a sheet stamping, namely a sheet stamping comprising an undercut, is introduced at a specific fastening or retaining section on the metal plate to which a functional support is to be fastened.

A functional support, by way of example in the form of a plastics material part, can then be anchored in this sheet stamping comprising an undercut and configured in the manner of a recess, and this part is provided on the fastening side with a catch. This catch preferably comprises at least two snap-on fingers located in the circumferential direction or opposing each other, comprising projections protruding into the undercut, whereby the fastening part can be securely and firmly inserted and anchored on the metal plate in the region of the stamping provided with the undercut.

To prevent accidental removal or withdrawal of the functional part provided with the catch from the recess, provided with an undercut, in the form of an impression, according to one design a locking element can optionally then be attached to the functional part, and this prevents the catch finger formed in the manner of a catch and provided with projections from being withdrawn counter to the latching direction and the functional part from being able to be lifted.

The functional part itself can have a wide variety of designs, by way of example with a cross member, etc. in order to fasten cables, axially displaceable connecting rods, and decoupling elements, etc. thereon.

The stamping provided with an undercut preferably consists of a recess opposite the circumferential plate material, by way of example in a rotationally symmetrical form or in a form different to this with a different longitudinal or transverse extension. The undercut therefore does not have to be designed so as to be circumferential either and instead is preferably at offset locations that are at least different in the circumferential direction.

The stamping or impression can also be provided such that is does not protrude over the plane of the bottom of the plate, in particular if, adjacent to the stamping provided with the undercut, the remaining plate material section is relatively lowered in the opposite direction so that the corresponding retaining and anchoring section with the recessed stamping provided with the undercut protrudes above the reflector material in an elevated manner.

Finally, within the meaning of a functional reversal, a design of the retaining and anchoring section is also possible in such a way that a circumferential recessed stamping is formed which, by way of example, has undercuts which are adjacent to each other but not opposing (because by way of example an annular recess is formed in which the undercut is provided in the centrally located "island") so that a catch with projections pointing towards each other can be attached thereto. This may be achieved by way of example in that a more annular recess is worked into the metal sheet as a stamping, wherein a circumferential or intermittent undercut is formed in the centre of the annular, ring-like or oval, etc. recessed elevation.

Basically it would also still be possible and conceivable for no shared, continuous, and in particular recessed, stamping to be formed opposite the surrounding plate material comprising a circumferential undercut, but for mutually offset stampings, single stampings comprising at least one undercut to be formed instead so that one functional part respectively comprising corresponding feet constructed in the manner of a catch can be attached so that the individual feet can engage in a stamping associated therewith in each case and can reach behind the undercut located there.

BRIEF DESCRIPTION OF THE DRAWINGS

The invention will be described in more detail hereinafter with reference to drawings, in which, in detail:

FIG. 1 shows a schematic three-dimensional diagram of a metal plate with a region which is to be reshaped as a retaining and fastening region, FIG. 8a shows a corresponding diagram of the metal plate produced by the preceding steps in cross-section, with a retaining and fastening section with undercuts in the region of a recess for fastening further functional parts, FIG. 8b shows a plan view of the diagram according to FIG. 8a, FIG. 9a shows a schematic vertical section through the metal sheet accordingly deformed in the preceding steps before insertion of an anchoring and functional body in a first variant.

DETAILED DESCRIPTION OF NON-LIMITING EMBODIMENTS

FIG. 1 shows a schematic detail of a plate or metal plate 1 which is sometimes also called a sheet or metal sheet 1 below. A region 2 is shown defined on this metal sheet, in which by way of example a retaining and fastening section 5 according to the present invention is to be provided.

Even if in the present case only a metal plate 1 or a sheet and a metal sheet 1 are mentioned, this is taken to mean any metal plate which may be made from metal or a metal alloy, by way of example from iron or an iron alloy, from aluminium, brass, copper or mixed alloys, from punched and rolled metal sheets or from cast plates which have been produced in a casting process, etc. There are no limitations in this respect.

Preferably as is described below, a metal sheet is by way of example correspondingly deformed using a pressing tool to produce the retaining or fastening section 5 mentioned above.

Figure 2C:
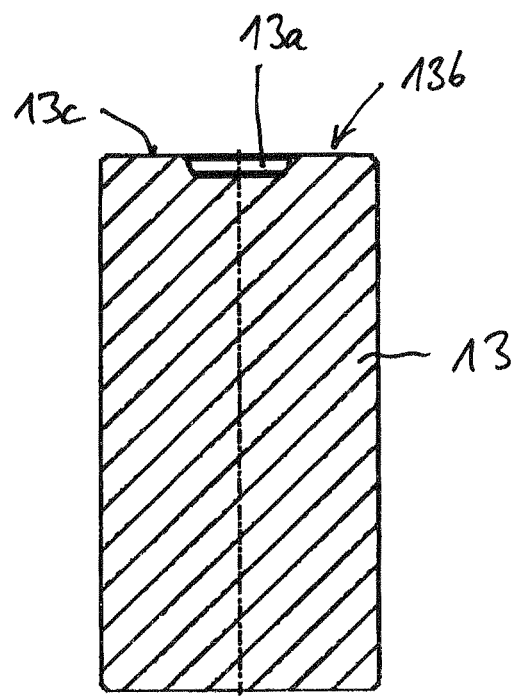
FIG. 2c shows a side view of the die illustrated in section in FIG. 2a, FIG. 2d shows a plan view of the stamping surface of the die reproduced in section in FIG. 2c.
Figure 2D:
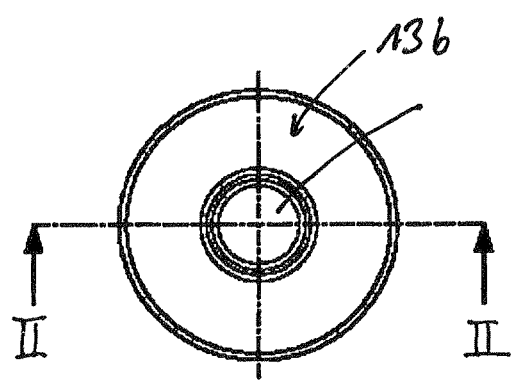
FIG. 2 shows a schematic, vertical section through a first pressing tool for producing a recess in a metal plate as a first method step.
FIG. 2a shows a bottom view of the punch shown in FIG. 2.
FIG. 2b shows a side view of the punch shown in FIG. 2.
Figure 2:
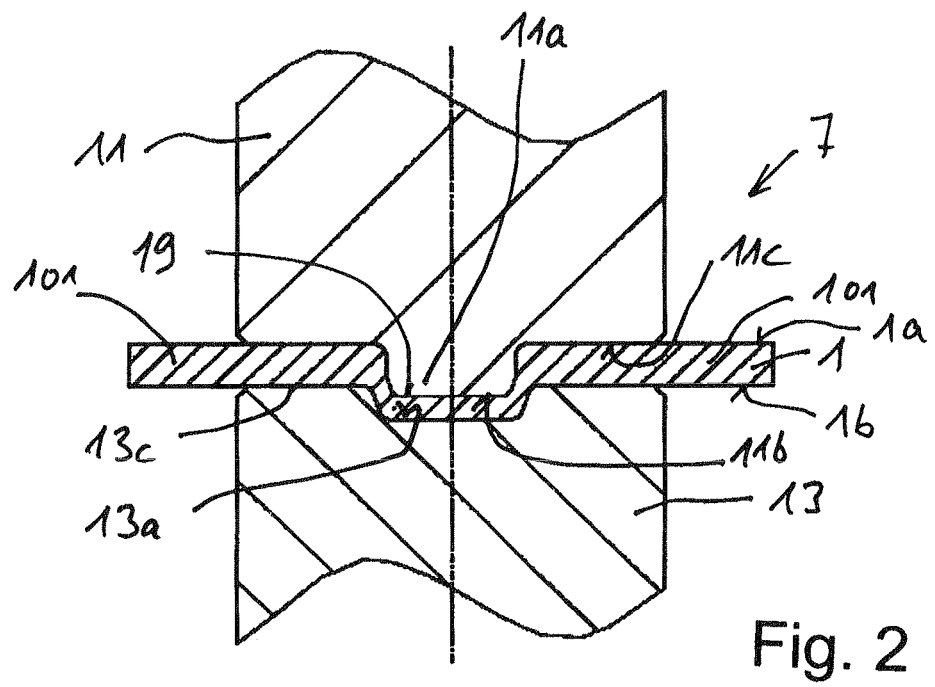

The pressing tool 7 is shown with reference to a first schematic cross-section according to FIG. 2 and, more precisely, with a first punch 11 with punch pins 11*a* protruding downwards at the end face in the stamping direction, and the die 13 located therebelow with a relief 13*a* made therein.

Supplementing FIG. 2, a plan view, i.e. bottom view of the first punch 11, is reproduced with reference to FIG. 2*a*, a side view of the punch 11 is reproduced in FIG. 2*b*, a side view of the die 13 used in FIG. 2 is reproduced in FIG. 2*c* and a plan view of the die 13 is reproduced in FIG. 2*d*, wherein the cross-section according to FIG. 2*c* reproduces a section along the line II-II in FIG. 2*b*.

In a first stamping step, the punch 11, which is located at the top in the illustrated example, is moved, as a rule lowered, relative to the die 13 such that between the end-face stamping side 11*b* of the stamping pin 11*a* and the relief 13*a* introduced into the end face 13*b* of the die a recess 19 is impressed into the metal sheet 1, as may be seen in cross-section in FIG. 2 at the end of the stamping process after lowering of the punch. At the end of the pressing process an undeformed region 101 of the metal sheet 1 is located between the annular end face 11*c* adjacent to the stamping pin 11*a* and the annular die face 13*c* adjacent to the relief 13*a* in the end face 13*b* of the die (FIG. 2*c*). In other words, material of the metal plate 1 is pressed by the protruding stamping pin 11*a* into the region of the die relief 13*a* so that in the illustrated embodiment a cup-shaped or cylindrical recess 19 is produced in the metal plate or metal sheet 1.

The embodiments are described in such a way that the punch is lowered downwards from above towards the die. The orientation can be arbitrary, however. Therefore the die may also be arranged at the top and the punch be provided at the bottom, wherein the punch then moves upwards to carry out the deformation. The punch and die can similarly be provided in any desired orientation, including by way of example a horizontal orientation as well. There are no limitations in this respect. What is important is merely the relative mobility of punch and die.

Figure 3:
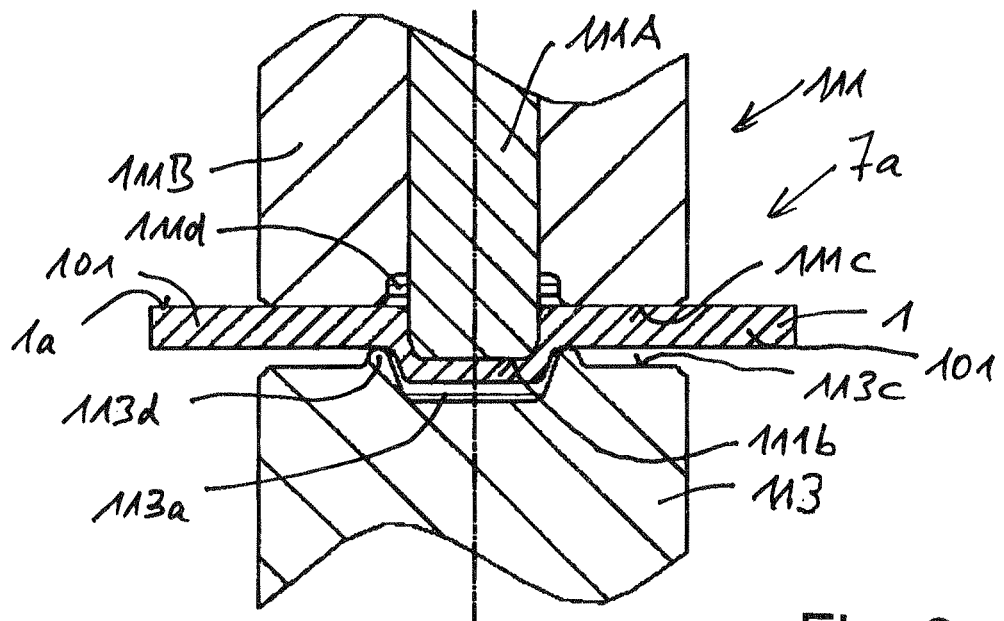
FIG. 3 shows a vertical cross-section through a second pressing tool for carrying out the next method step by reshaping the metal plate.

In a next pressing tool 7*a* according to the schematic, simplified axial cross-section according to FIG. 3, a next, here a second, stamping step is carried out to form an annular material protrusion 23 at the edge of the recess 19 in the retaining and fastening section 5, and this protrudes above the level of the metal plate in the opposite direction to the recess 19.

In place of said two successive stamping steps above, the two stamping steps mentioned above could also be carried out jointly in a single stamping step, if namely in FIG. 3 a correspondingly undeformed plate 1 is inserted between the punch and die and then the illustrated punch is moved towards the correspondingly shaped die, i.e. relative thereto.

In the illustrated embodiment a two-part punch 111 is provided for carrying out the second stamping step mentioned here, and said punch has an internal, in the illustrated embodiment cylindrical, inner punch 111A and a hollow cylindrical outer punch 111B which surrounds it, and these are axially displaceable relative to each other.

The die 113 located therebelow in turn has a die recess or die relief 113*a*, which however has a circumferential stamping edge 113*a* protruding above the annular die face 113*c*.

Figure 3A:
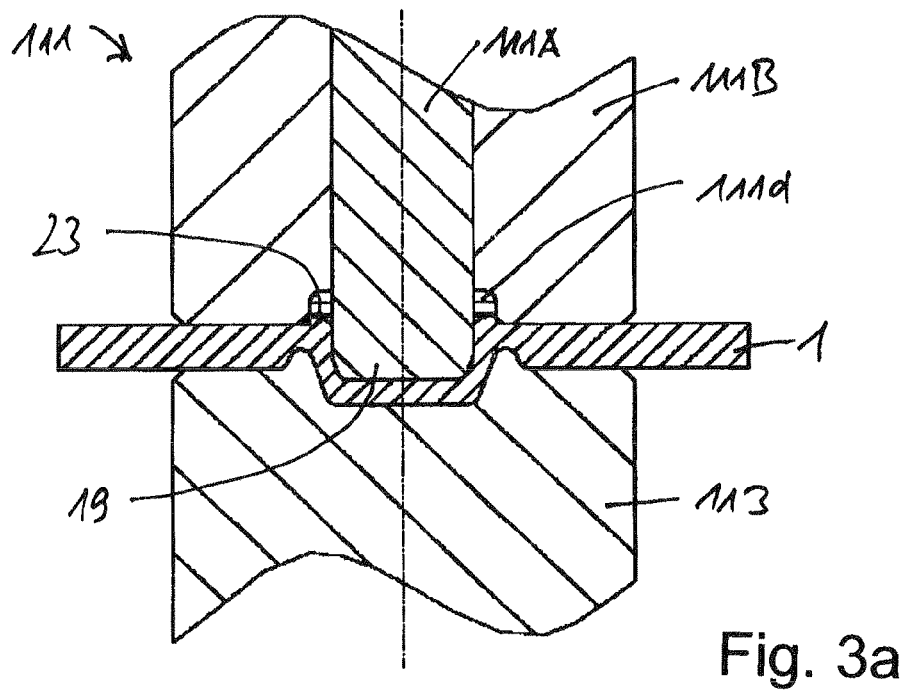
FIG. 3a shows a cross-section similar to FIG. 3 at the end of the deformation carried out in this step.

If the metal plate 1 formed with the recess 19 in the first method step is positioned in this pressing tool 7*a* and then the punch, i.e. as a rule the inner and outer punchs 111A, 111B, uniformly moves forwards downwards onto the die 113, generating high pressing and stamping forces, until the annular end face 111*c* of the outer punch 111B in turn retains the undeformed material section 101 of the metal plate 1 pressed against the annular end face 113*c* of the die 13 and the leading cylindrical section (end face 111*b*) of the punch 111A immerses completely into the recess 19 of the metal plate 1, the design of the elevated circumferential edge 113*d* in the die adjacent to the die relief 113*a* presses some of the material of the plate 1 into the annular groove or annular recess 111*d* around the inner die 111A. The bead, ring or collar 23 formed as a result, which protrudes above the surface or upper side 1*a* of the metal plate 1, is indicated in FIG. 3*a*, wherein the bead, ring or collar 23 engages in said annular groove or annular recess 111*d* at a part height.

Figure 4:
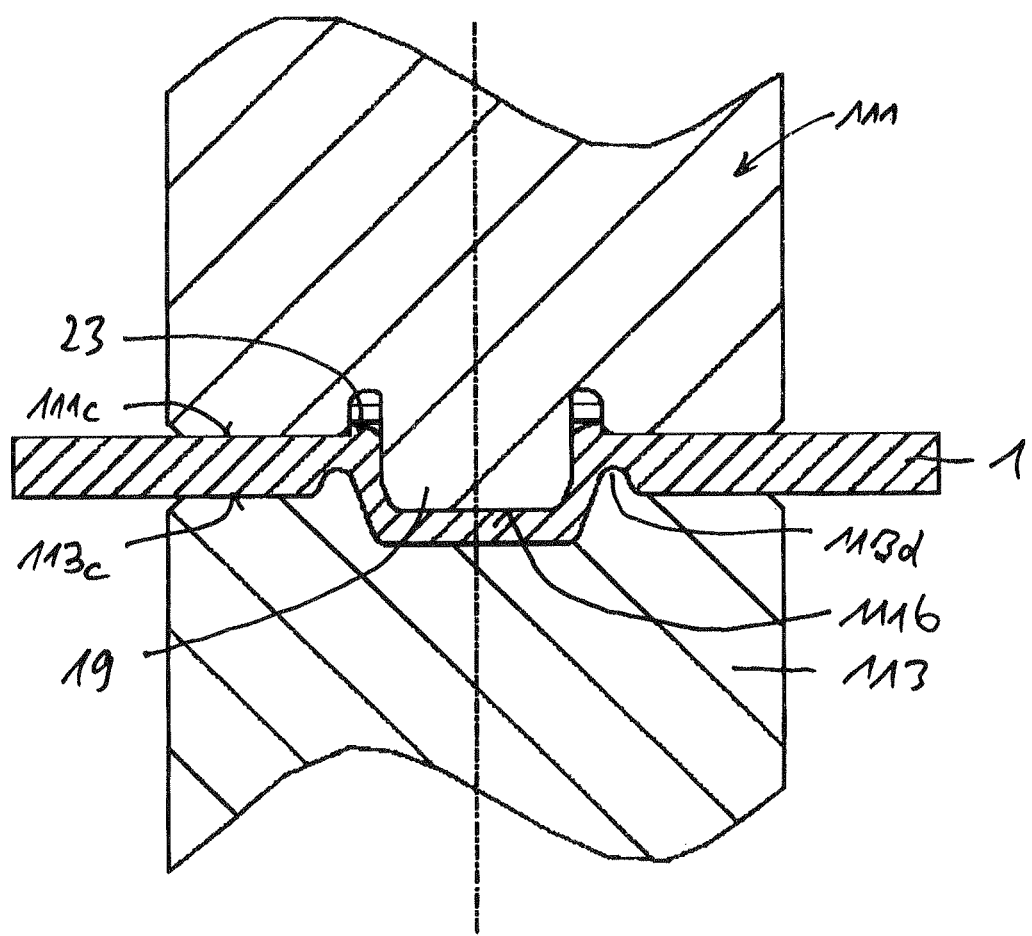
FIG. 4 shows a vertical cross-section through the pressing tool shown in FIG. 3 at the end of the corresponding deformation step.

With reference to FIG. 4 it is also shown schematically and in section that, in contrast to the diagram according to FIG. 3, the punch does not necessarily have to be divided in two but can instead be formed in one piece since it is only the overall design of the end-face pressing surface which is important in this method step.

Figure 5:
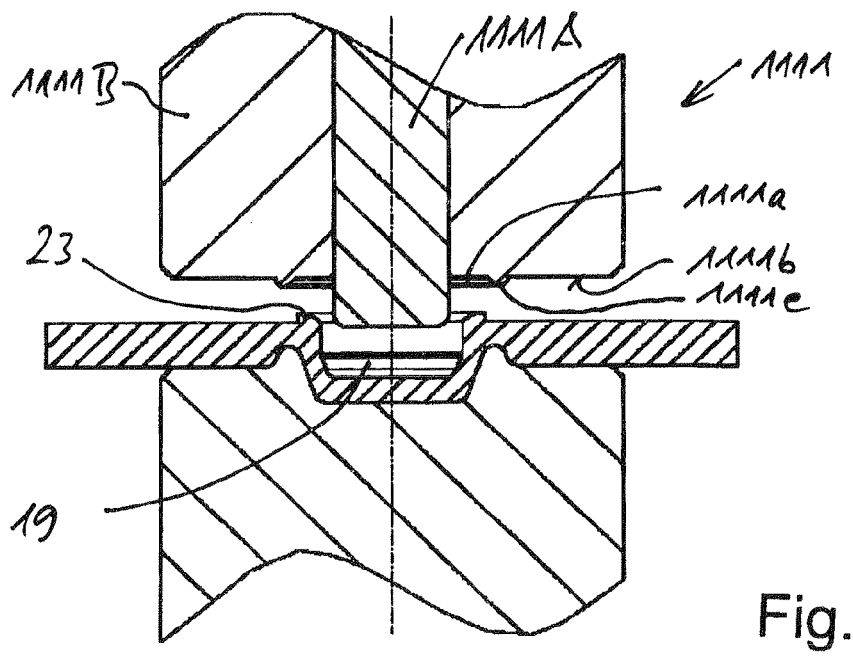
FIG. 5 shows a corresponding cross-section using a third pressing tool before carrying out the next deformation step.

The punch 111 is then withdrawn upwards with the inner and outer punchs 111A, 111B to carry out the next deforming step in the next method step according to FIG. 5 using the next punch 1111.

According to the diagram in FIG. 5 an punch 1111 is accordingly used which in the illustrated embodiment has, adjacent to the inner punch 1111A, on the outer punch 1111B, an end-face stamping side 1111*a* which corresponds to the outer level of the stamping ring 1111*b,* wherein a circumferential, slightly projecting stamping ring 1111*e* is formed therebetween. In other words, the outer punch 1111B therefore has an end face which is basically designed so as to be flat, and, at a spacing from the outer circumference of the inner punch 1111A, has a stamping ring 1111*e* protruding in the stamping and pressing direction.

Figure 6:
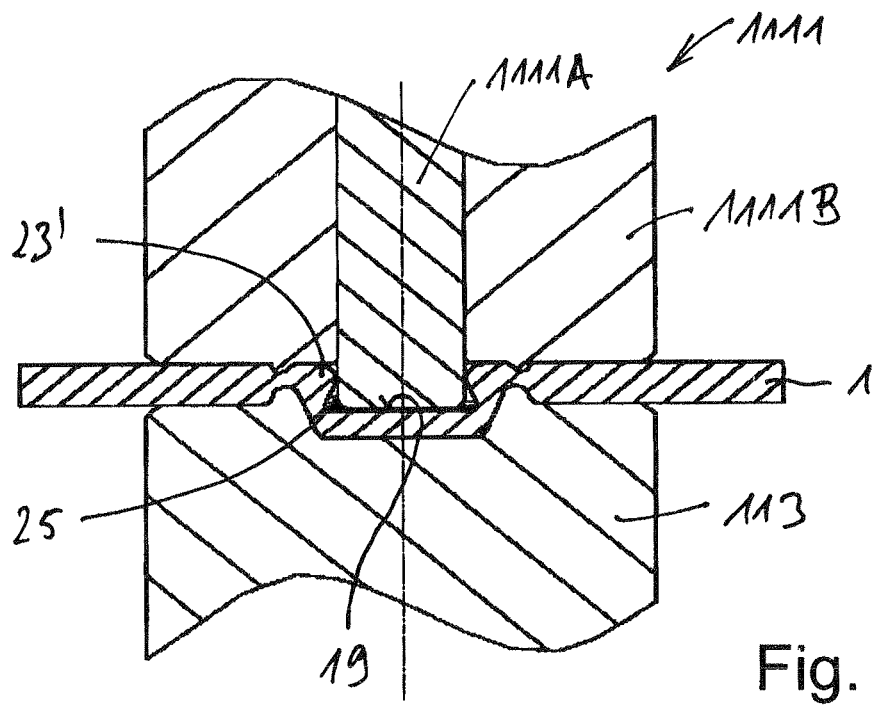
FIG. 6 shows a diagram of a third pressing tool with reshaping of the opening size produced in the preceding method step and defined by a metal plate provided with a recess.

The consequence of this, when the punch 1111 designed in this way is moved downwards according to the diagram in FIG. 5, is that the already formed elevated section or collar or ring or bead 23 on the plate material adjacent to the recess 19 (i.e. the section protruding above the upper surface level of the metal plate) accordingly forms a radially inwardly protruding edge 23', simultaneously producing an undercut 25 in the recess or opening 19 below the radially protruding edge 23' (see FIG. 6). The circumferential edge 23' delimits an access opening 26 to the recess 19.

Since the inner punch 1111A projects into the recess 19 in this method step as well, calibration of the edge 23', i.e. stamping of the material of the metal plate in the region of the recess 19 with a defined opening size, is ensured according to the external size of the inner punch 1111A.

Figure 7:
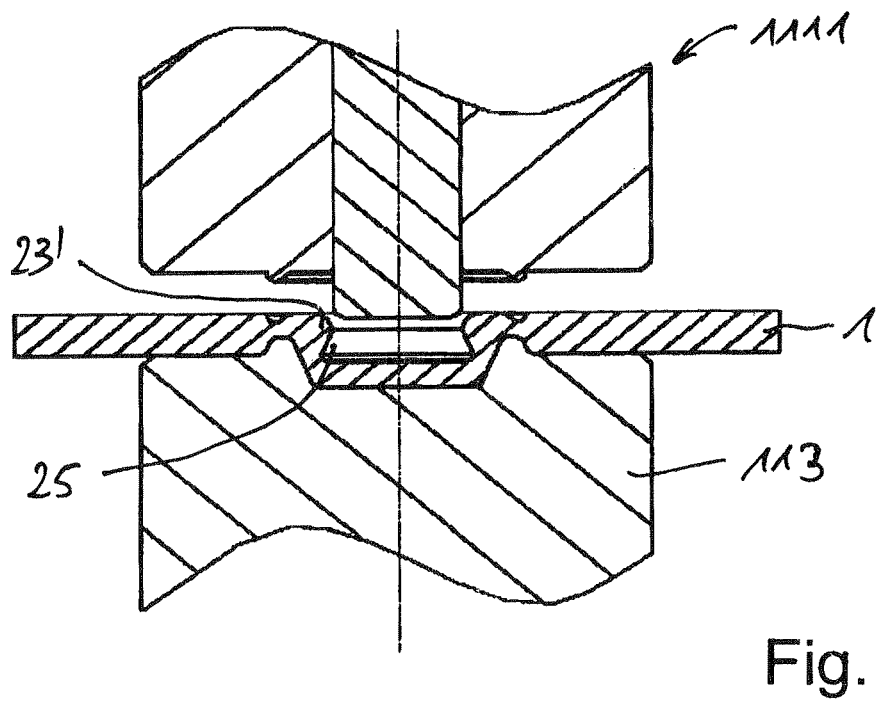
FIG. 7 shows a corresponding diagram to FIG. 6 during the lifting operation of the pressing tool and in particular of the extrusion die.

Following corresponding removal of the punch 1111 (FIG. 7) and raising of the plate material stamped and deformed in this way, the cross-sectional shape reproduced with reference to FIG. 8*a* is therefore produced and the plan view illustrated in FIG. 8*b*, with the recess 19, formed in the metal plate 1 at said retaining and fastening section 5, comprising the corresponding undercut 25, is produced. This undercut 25 is formed by a material edge 23' protruding into the opening of the recess 19, the upper side or surface 23*a* of which edge comes to rest in this embodiment at the level of the upper side 1*a* of the metal plate 1 (even though some differences are completely possible here as well).

A functional support 27 may accordingly be easily fastened at this point, optionally detachably fastened, wherein a functional support 27—which will be depicted below—can be introduced via the access opening 26 into the recess 19 and be anchored therein.

Figure 9B:
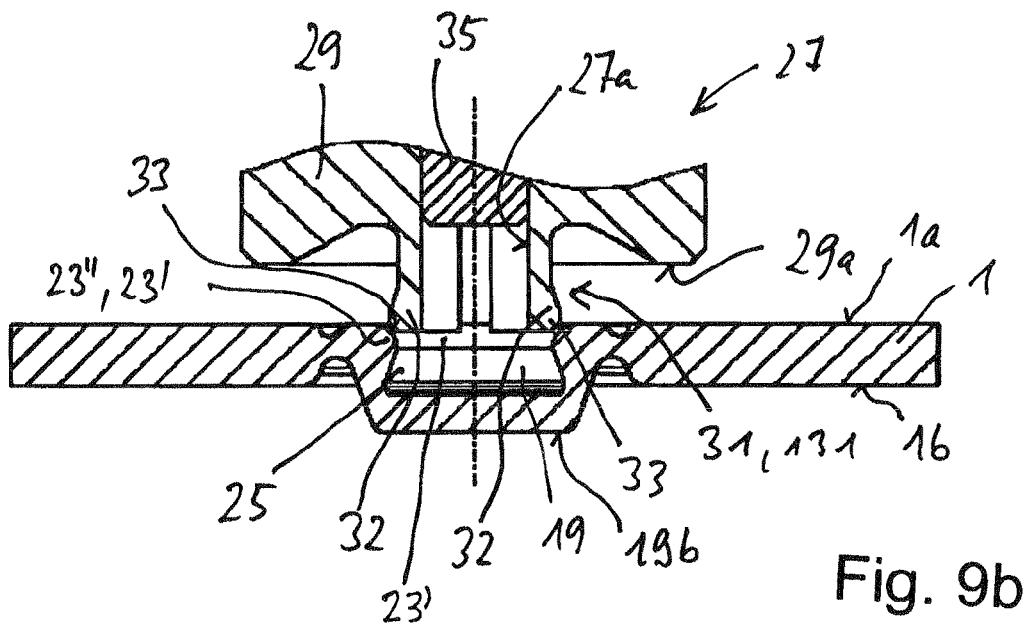
FIG. 9b shows a modification to the cross-section in FIG. 9a, FIG. 10a shows a corresponding diagram to FIG. 9b after insertion of the functional body.
Figure 9A:
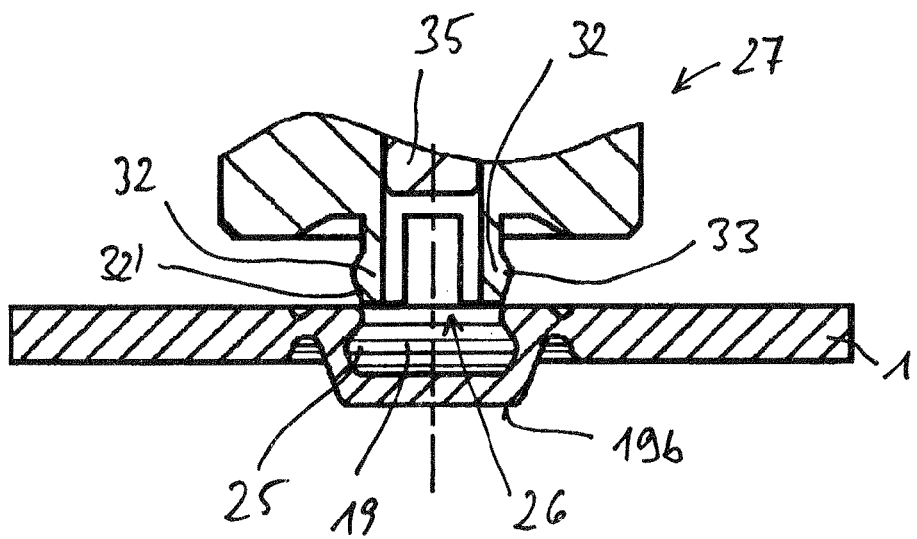

FIG. 9a shows a corresponding functional support 27 in a schematic side view in a first embodiment and FIG. 9b shows it in a slightly modified embodiment prior to insertion into a corresponding recess 19 in the metal plate 1.

The support comprises a base section 29 which can be designed by way of example so as to be cylindrical. As an anchoring or retaining section 131 a snap-on mechanism 31 is formed over its lower supporting surface 29a so as to be axially protruding, by way of example with two opposing snap-on fingers 32 which are resiliently deformable and have outwardly projecting snap-on lugs 33. The axial length of these snap-on lugs roughly matches the height of the recess 19. The effective spacing between the snap-on lugs 33 protruding in opposing directions preferably matches at least the maximum spacing in the region of the undercut below the entry opening 26 with the opening edge 23' formed in this way.

A functional support 27 formed in this way can therefore be introduced axially into the opening 26 until the functional support 27 sits on the base of the recess 19 surrounded by the undercut 25, wherein the at least two snap-on fingers 32 are braced against each other because the leading wedge-shaped flanks 32' of the snap-on fingers 32 rise at the opening edge 23' of the recess 19 and are consequently pressed together (FIG. 9a), wherein as the catch fingers are inserted further with their rising, oblique flanks 32' behind the tapering opening edge 23' they widen and expand again in the region of the undercut 25 and in this way hold the catches in the recess 19. The downwardly pointing, circumferential contact surface or the supporting region 29a then rests on the upper side 1a of the metal plate 1, ensuring a secure seat.

In a deviation from this, in the variant according to FIG. 9b the circumferential opening edge 23' diverges upwards from the recess 19 or is provided with a corresponding diverging rounded section 23", which in the sense of a kinematic reversal therefore has the same effect as in the embodiment according to FIG. 9a, namely ensures that the corresponding snap-on fingers rise onto this rounded opening edge 23', are pressed together with further insertion and when the undercut is reached can swivel out or open again owing to the intrinsic resilient tension, to thereby firmly and securely retain the functional support 27 in the recess 19.

Both of the effects mentioned above according to FIGS. 9a and 9b can equally be simultaneously provided to facilitate the insertion movement.

For the sake of clarity, it is also noted that or snap-on fingers which are separated from each other by partitions or separation slots do not necessarily have to be formed in the circumferential direction. It would also be possible for the entire snap-on mechanism 31 to be designed as a cylindrical snap-on mechanism 31 provided with a circumferential bead and which, when placed on the opening edge 23' of the recess provided with the undercut, presses together as a whole owing to an intrinsic resilience and, once the undercut in the recess 19 is reached, assumes its open position again by way of a resilient expansion and consequently retains the functional support in the recess with its circumferential bead. In other words, a resiliently sprung cylinder wall or a resilient cylinder jacket with the corresponding bead-like formation on its outer side is therefore provided instead of snap-on fingers. Further modifications which achieve the same effect are possible.

Figure 10A:
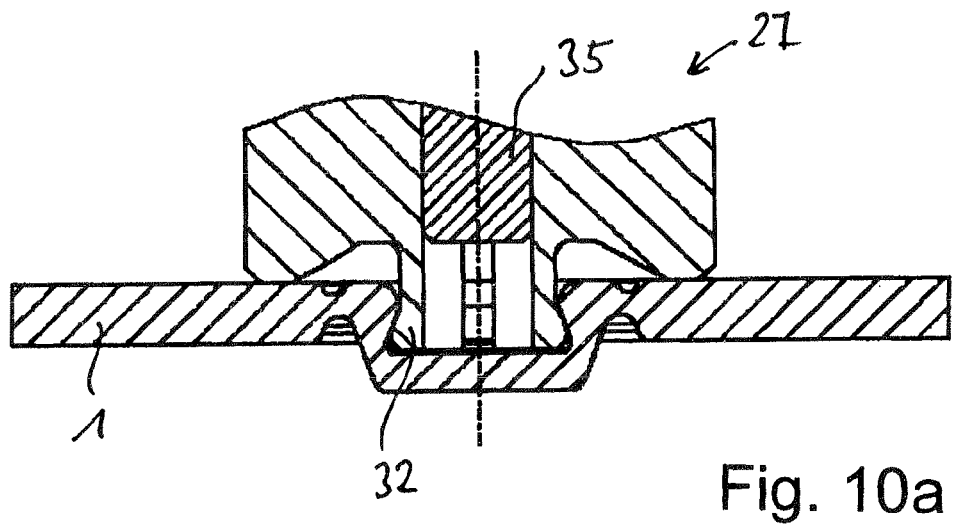
FIG. 10b shows a corresponding diagram to FIG. 9a and, more precisely, after insertion of the functional body.
FIG. 10c shows a corresponding diagram to FIG. 10a once an internal securing pin has been lowered into the securing position.
FIG. 10d shows a corresponding diagram to FIG. 10b after lowering of the securing pin.

The overall arrangement is such that the shaping of the lugs on the catch 32 and their axial length in relation to the recess of the functional supports 27, which recess is provided with the undercut, mean the supporting surface of said functional supports is retained under pre-tension pressed to the upper side 1a of the metal plate (see FIG. 10a).

Finally, a blocking pin 35 can also be inserted in the functional support 27 via a central hole 27a, and this is introduced as far as the region of the snap-on fingers 32 and prevents the snap-on fingers 32 from being able to be pressed together again and the functional support 27 from being able to be removed from the recess even when there is an attempt to remove the functional support 27. The pin 35 introduced via the central opening 27a and the functional support 27 therefore constitutes a blocking or locking pin.

Figure 10B:
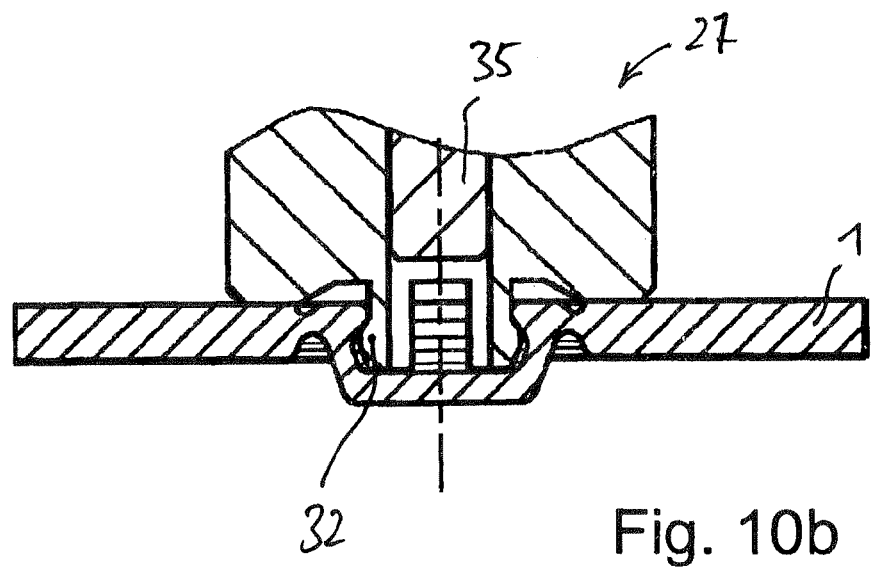
Figure 10C:
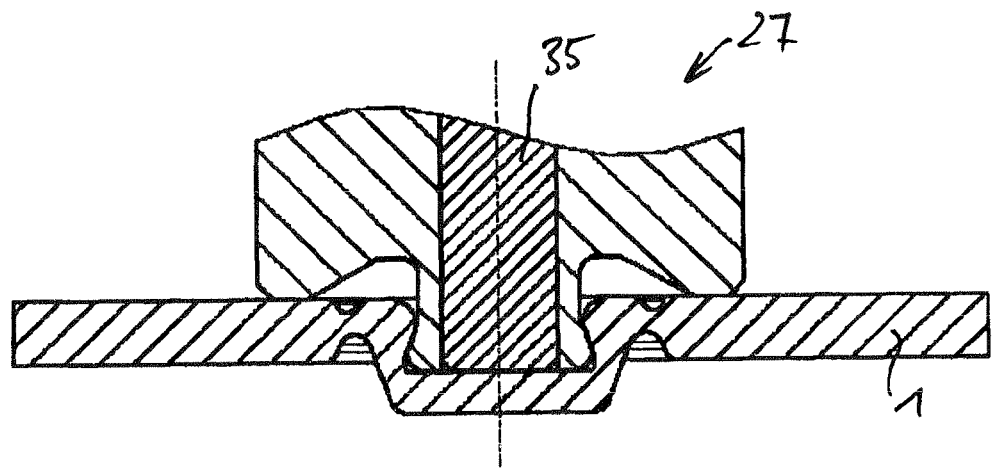
Figure 10D:
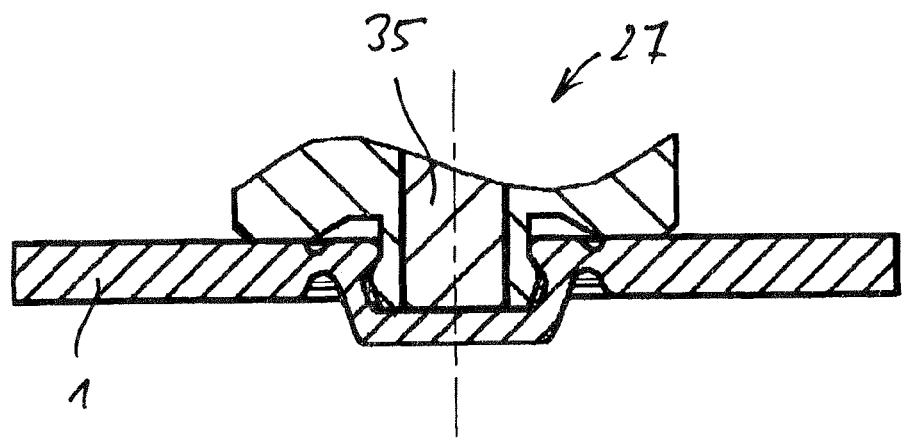

FIGS. 9a and 9b show corresponding diagrams of the functional support 27 before insertion of its anchoring section 131, i.e. before insertion of its snap-on mechanism 31, into the recess 19, wherein FIGS. 10a and 10b show the corresponding diagram after insertion of the snap-on mechanism 31 in the recess 19 and is shown in FIGS. 10c and 10d in the locked end position in which said blocking pin 35 would in each case break through downwards or be lowered as far as the base of the recess 19 to block and secure the snap-on mechanism 31.

Said filling or blocking pin 35 can, however, also be integrally connected to the functional support, by way of example by a thin bridge of plastics material or by a film-like join. The pin is consequently captively retained in the functional support in a raised position and to secure the functional support only has to be downwardly broken through by a tool after latching of the functional support in order to transfer the pin into its lowered blocking position in FIG. 10c or FIG. 10d in which it projects into the recess 19, preferably up to the base of the recess 19 (see FIG. 10b).

However, the anchoring and retaining section 131 does not necessarily have to comprise a snap-on mechanism 31 forming one or more snap-on finger or snap tongue 32. It is also possible for the anchoring or retaining section 131 of the functional support 27 to have a resilient retaining or snap-on mechanism 131 in the form of a circumferential anchoring wall or in a cylindrical shape with an outwardly circumferential bead or a bead which is mutually offset in sections, wherein the anchoring or retaining section 131 formed in this way can be inserted into the recess 19 in the metal plate 1 such that the outwardly circumferential bead or bead which is offset in sections in the circumferential direction engages in the undercut 25 in the recess 19 and consequently retains the functional support 27 firmly and securely.

A modification to the anchoring of the functional support 27 in the recess 19 is also possible, however, in that by way of example the functional support has an anchoring section located at the bottom which is to be introduced into the recess 19 and is pressed by means of hot caulking into the stamping with the undercut. In other words, the corresponding anchoring section of the functional support is deformed by the hot shaping such that material flows into the region of the undercut and once the functional support has cooled is captively and firmly retained in the corresponding recess as a result.

In contrast to the illustrated embodiment, the recess 19 does not necessarily have to be rotationally symmetrical. It can by way of example have a polygonal shape in plan view or a shaping with a greater length than breadth. An oval shaping is also conceivable. A functional support 27 would preferably be used in this case, however, whose snap-on mechanism 31 with the associated snap-on fingers 32 approaches this basic shape in such a way that the functional support 27 sits as non-displaceably and non-rotatably as possible in the recess 19 formed in this way.

It is also possible that by way of example two or more corresponding stampings are made in a sheet, in particular a reflector sheet, at a predefined spacing from each other, by way of example by a correspondingly double or multiple stamping tool, so that a functional support can be inserted there which is or are provided by way of two or more spaced-apart anchoring sections comprising at least one or more snap finger(s) respectively, wherein by way of example a separate stamped recess 19 is associated with each snap-on finger, in which recess the finger can engage. A functional support can consequently likewise be non-rotatably fixedly retained and anchored as a whole on the metal sheet 1.

Figure 11A:
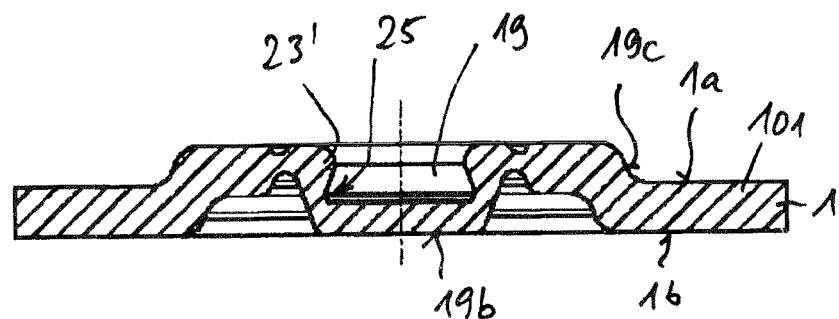
FIG. 11a shows a schematic cross-section through a metal plate provided with the retaining and fastening section according to the invention, wherein the retaining and fastening section provided in the recess is raised with respect to the undeformed section of the metal plate.
Figure 11B:
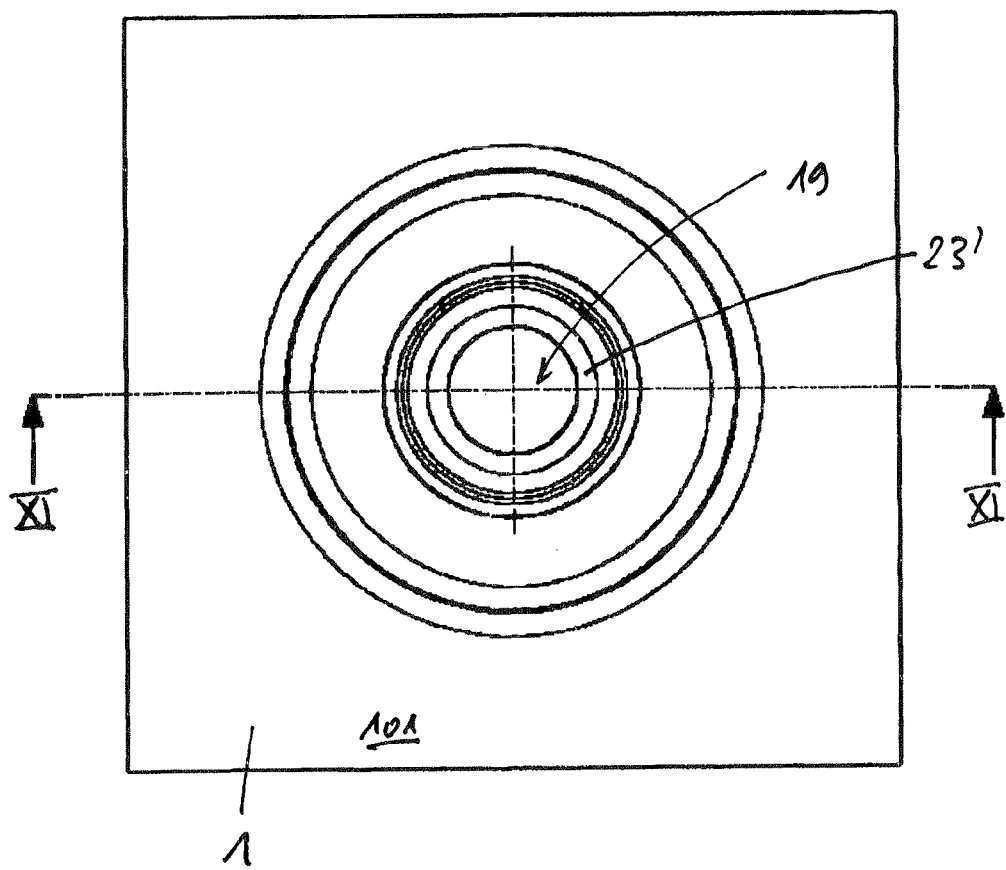
FIG. 11b shows a plan view of the diagram according to FIG. 11a, FIG. 12a shows a modified embodiment in cross-section having a more annular-channel-shaped or annular-channel-like recess forming an elevated central section on which the edges, which tend to point away from each other, i.e. are protruding and comprise the undercuts located below, are provided.

In the illustrated embodiment the bottom 19b of the recess 19 of the metal sheet 1 comes to rest in the region of the retaining and fastening section 15 at a level which is lower than the bottom 1b of the metal plate adjacent to the recess 19. This does not necessarily have to be the case since by way of example the retaining and fastening section 5 can be deformed before the start of the described deformation and stamping, at the end or in an intermediate step or together, i.e. simultaneously with execution of another stamping step, such that the entire retaining and fastening section—as is indicated in FIG. 11a—comes to rest at a higher level above circumferential descending shoulders 19c. The arrangement may be such that by way of example the bottom 19b of the recess 19 comes to rest at the same height as the bottom 1b of the metal sheet adjacent to the recess, or rests even higher, as shown in FIG. 11a in cross-section and in FIG. 11b in plan view.

It is also noted that the undercut 25 does not have to be designed so as to be circumferential in the region of the recess 19. It may also be designed in sections. It must be present at least in those sections in which the snap-on fingers 32 are intended to be anchored in the region of the undercut.

In contrast to the illustrated embodiment, it is also not necessary for a single recess 19 to be provided with a corresponding undercut in which a snap-on mechanism as a whole is inserted. It would also be possible for corresponding recesses 19 to be made in the metal sheet 1, by way of example in two, three or more mutually offset regions (preferably not located side by side on a line but provided with respect to each other in all arrangements), each recess having an undercut, and it then being possible to attach a functional support 27 with, for example, two, three or more feet, wherein one foot respectively is introduced with a snap-on finger into one of the recesses. This requires the use of stamping and pressing tools with a complicated design, however.

Figure 12A:
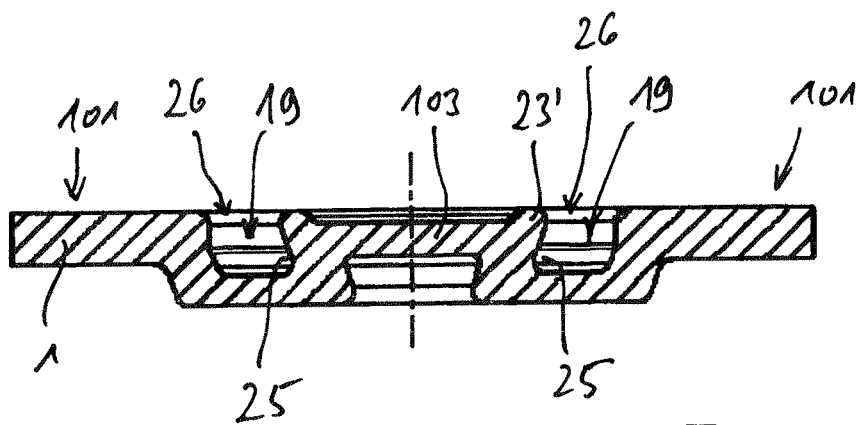
FIG. 12b shows a plan view of the diagram according to FIG. 12a, and FIG. 13 shows a corresponding diagram to FIG. 12a with attachment of a blocking ring which prevents a functional body attached by spreader fingers from being able to be unintentionally removed from the retaining and anchoring section.
Figure 12B:
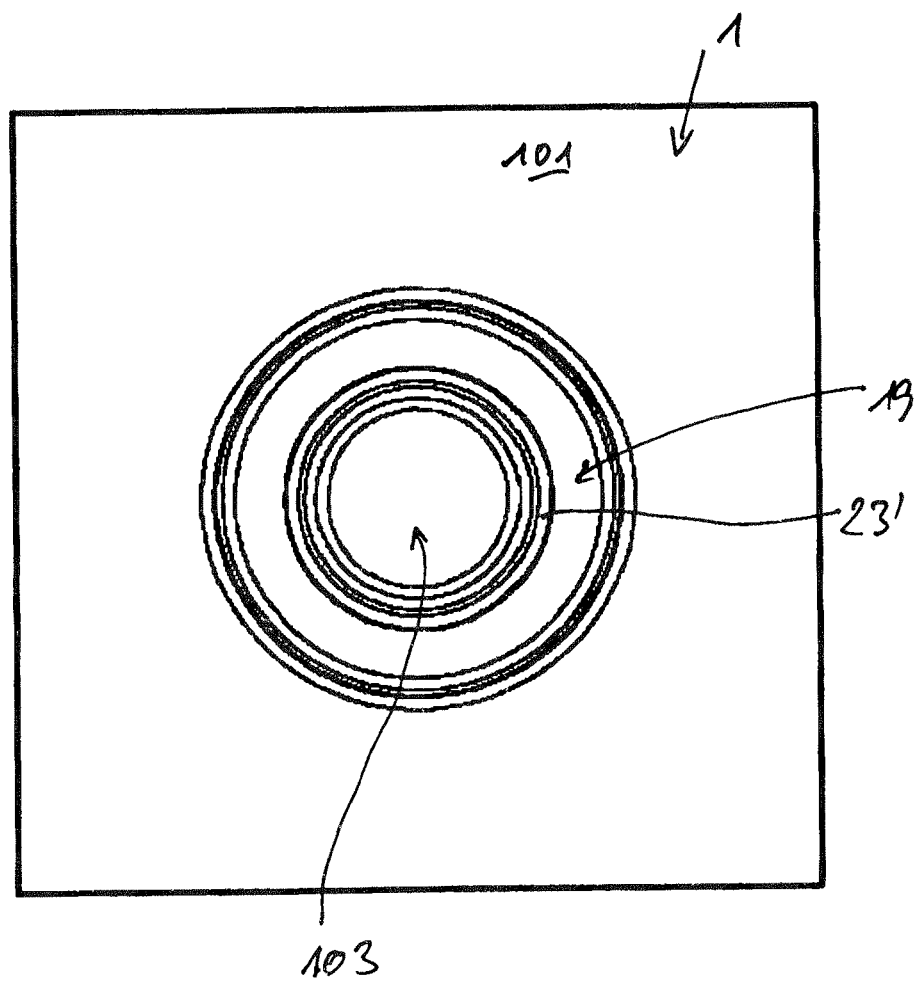

A modified embodiment of a metal sheet 1 deformed by stamping and reshaping is shown in cross-section with reference to FIG. 12a and in plan view in FIG. 12b. The embodiment likewise reproduces a retaining and fastening section 5 in cross-section. In this embodiment an annular (i.e. generally an annular-channel-shaped or annular-channel-like, etc.) recess has been produced more or less in the sense of a reversal, and the recess has a circumferential undercut 25 in its central region. FIG. 12b reproduces a corresponding plan view of this embodiment. During deformation of the upwardly protruding edge 23 into the folded edge 23' protruding in the direction of the annular recess with formation of the undercut located therebelow, an punch provided a corresponding cup-shaped opening can then preferably be used which serves as a calibrating punch to delimit the more radially outwardly protruding edge 23' from a central section.

Figure 13:
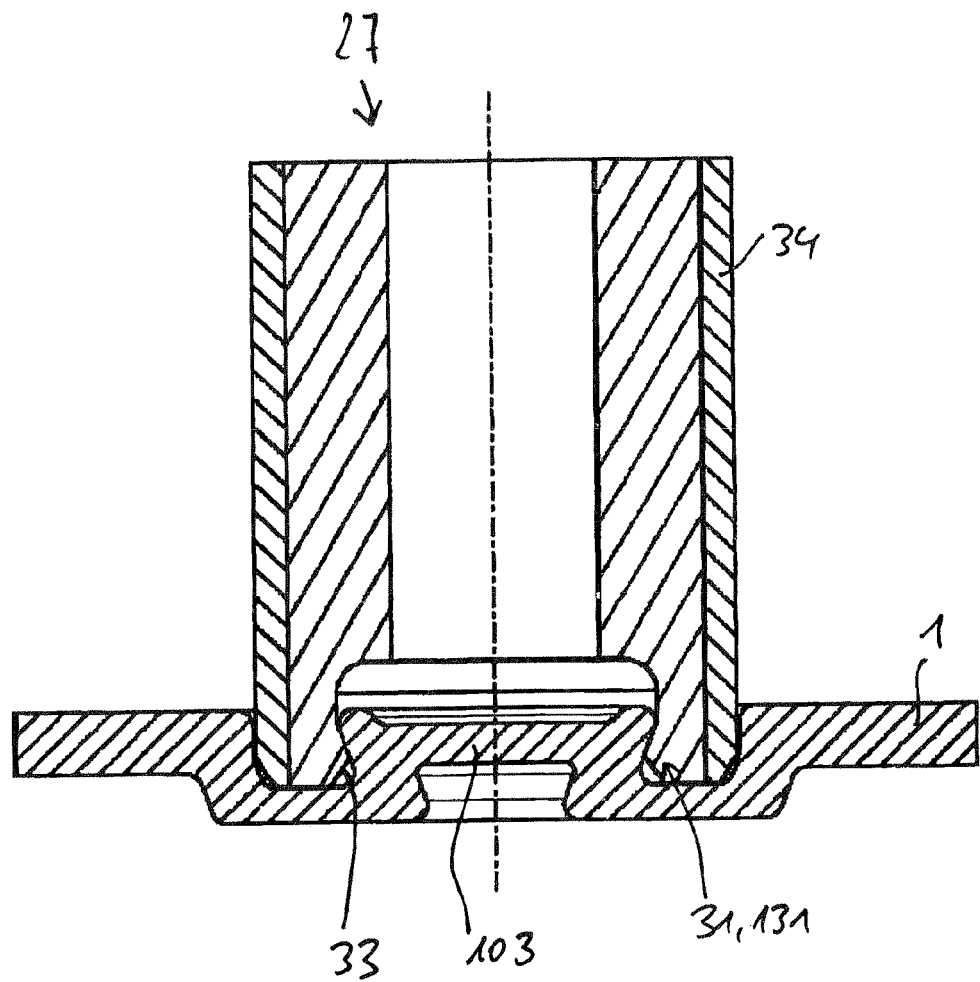

As is shown with the aid of FIG. 13 a corresponding functional support 27 can accordingly be anchored on this retaining and fastening section 5, wherein the functional support 27, in this case as an anchoring and retaining section 131, has a snap-on mechanism 31 with at least two or by way of example three or more snap-on fingers 32 offset in the circumferential direction and which have snap-on lugs 33 projecting radially inwardly. These would then come to rest in the undercut 25 after attachment, in other words would retain the functional support 27 on the middle section elevated in a mushroom-like manner. As security against unintentional removal of the functional support in this case a corresponding ring 34 or a hollow cylinder or a bracket or the like could be pushed downwards and may possibly even be inserted as far as into the recess 19 and secure the snap-on fingers against radial outward swivelling so that the functional support is firmly retained on the metal sheet 1, in particular a reflector sheet so that it cannot be unintentionally removed.

An edge 23' and a corresponding undercut 25 have generally been mentioned. Edge sections 23' that are spaced apart from each other can equally be provided, however, forming undercuts 25 located therebelow respectively.

It has been described within the context of the embodiments that a corresponding recess can be completed in a metal part in preferably three steps, in particular in three successive steps by also using different rams or optionally also different dies.

As has already been mentioned, the described first and second method steps can, as a rule, be combined without problems into a single method step in which the circumferential bead or edge 23 is also formed adjacent to the recess 19.

For the sake of completeness, it is also mentioned that ultimately all three method steps up to production of the final recess provided with the overlap can be carried out in a single method step, in particular if a pressing tool, by way of example comprising an extrusion die, is used which has additional movable deforming parts to, by way of example, fold the possibly upwardly protruding bead constructed in the meantime in this single method step, at the same time as or during the course of the same method step and to form the desired undercut.

The invention claimed is:

1. Retaining and anchoring device comprising:
   a reflector comprising a metal plate having an upper side, the metal plate defining a recess therein adjacent the metal plate upper side, the recess being configured to be free from holes or through passages,
   a retaining and anchoring structure disposed on the metal plate, the retaining and anchoring structure comprising:
      metal plate upper side circumferential edge portions which are spaced apart from one another, and
      at least one undercut portion below the circumferential edge portions, a said edge portion or plural said edge portions covering the at least one undercut portion;
   a functional support configured to be anchored in the retaining and anchoring structure, the functional support comprising a snap-on mechanism having snap-on fingers with radially outwardly projecting snap-on lugs configured to anchor in the at least one undercut portion; and
   a locking device configured to prevent unintentional removal of the snap-on mechanism from the recess beyond the said edge portion or plural said edge portions covering the at least one undercut portion,
wherein the functional support defines a passage therein, and the locking device comprises a blocking pin attached to the functional support by being inserted into the functional support passage at least as far as a region of the snap-on fingers so as to be disposed between the snap-on fingers, the blocking pin being configured to press against the snap-on fingers and thereby prevent the snap-on fingers from being able to move together, the blocking pin thereby being disposed and structured to prevent accidental removal or withdrawal of the functional support from the recess by preventing the snap-on fingers from being withdrawn counter to a latching direction and also preventing the functional support from being lifted away from the recess.

2. Retaining and anchoring device according to claim 1, wherein the recess is configured to be circular, oval, or polygonal.

3. Retaining and anchoring device according to claim 1, wherein the metal plate has an undeformed region having an upper side, and the upper sides of the circumferential edge portions come to rest at least approximately at the level of the upper side of the undeformed region of the metal plate.

4. Retaining and anchoring device according to claim 1, wherein the metal plate is configured to define the recess as a circumferential annular recess surrounding a central material region on which the circumferential edge portions which are offset in the circumferential direction are provided, wherein the at least one undercut portion is provided below the circumferential edge portions.

5. Retaining and anchoring device according to claim 1, further comprising a plurality of mutually offset recesses formed which at least in sections have edges which, by forming an undercut, project into an access opening delimited thereby.

6. Retaining and anchoring device according to claim 1, wherein the metal plate comprises a reflector sheet which forms the outer skin of a mobile radio antenna.

7. Retaining and anchoring device according to claim 1, wherein the snap-on mechanism includes at least two mutually offset elastically deformable snap-on fingers insertable into the recess, the snap-on fingers each being provided with a snap-on lug protruding transversely and with elastic deformation via said edge portions projecting beyond the at least one undercut portion.

8. Retaining and anchoring device according to claim 7, wherein the snap-on fingers comprise a central section comprising radial components, the snap-on lugs protruding outwards from the central section radial components.

9. Retaining and anchoring device according to claim 7, wherein the blocking pin is configured to be axially introduced into the passage in the functional support, the blocking pin being configured to block a rearward withdrawal space for the resilient snap-on fingers so that the snap-on lugs cannot be moved out of the at least one undercut portion.

10. Retaining and anchoring device according to claim 1, wherein the the snap-on lugs are configured to point towards each other.

11. Retaining and anchoring device according to claim 1, wherein the functional support includes a resiliently circumferential anchoring wall, the wall having a cylindrical shape and a bead which is outwardly circumferential or mutually offset at least in portions, wherein the anchoring or retaining section is configured to be inserted in the recess such that the bead is outwardly circumferential, or offset in the circumferential direction at least in portions, the wall engaging in the at least one undercut portion in the recess and consequently holding the functional support firmly and securely.

12. Retaining and anchoring device according to claim 1, further comprising an access opening defining a plane, wherein the recess has a base, and wherein the metal plate has an undeformed region and a transition region to the retaining and anchoring structure comprising the recess, the undeformed region defining a plane, the undeformed region being formed by deforming the transition region to the retaining and anchoring structure comprising the recess in such a way that the plane defined by the undeformed region of the metal plate comes to rest
 a) above the plane of the access opening, or
 b) at the level of the plane of the access opening, or
 c) below the plane of the access opening, or
 d) below the level of the base of the recess.

13. The retaining and anchoring device of claim 1 wherein the snap-on mechanism protruding snap-on lugs are further configured to flex away from the walls of the recess upon insertion into the recess and further flex toward the walls of the recess upon further insertion into the recess thereby snapping and exerting force against the walls of the recess, the exerted force associated with further flex toward the recess walls and the presence of the blocking pin between the snap-on fingers preventing the lugs from flexing away from the walls to thereby prevent removal of the lugs from the recess once the lugs snap against and engage the walls.

14. Retaining and anchoring device comprising:
 a reflector comprising a metal plate having an upper side, the metal plate defining a recess therein adjacent the metal plate upper side, the portion of the metal plate defining the recess being configured to be free from holes or through passages,
 a retaining and anchoring structure disposed on the metal plate, the retaining and anchoring structure comprising:
  metal plate upper side circumferential edge portions which are spaced apart from one another, and
  at least one undercut portion below the circumferential edge portions, a said edge portion or plural said edge portions covering the at least one undercut portion;
 a functional support configured to be anchored in the retaining and anchoring structure, the functional support comprising a snap-on mechanism having elastically deformable snap-on fingers with protruding snap-on lugs projecting radially inwardly and configured to anchor in and snappingly engage the at least one undercut portion; and
 a locking device configured to prevent unintentional removal of the snap-on mechanism from the recess beyond the said edge portion or plural said edge portions which covers the at least one undercut portion,
 wherein the locking device comprises a blocking ring which is axially displaceably guided on the snap-on mechanism and is configured to be lowered into a locking position such that the ring is structured and positioned to engage the snap-on fingers to prevent the snap-on lugs thereof from and being guided out of the at least one undercut portion by movement of the snap-on lugs in a radially outward direction.

* * * * *